US006705449B2

(12) United States Patent
Wagstaffe

(10) Patent No.: US 6,705,449 B2
(45) Date of Patent: Mar. 16, 2004

(54) BULK MATERIAL PROCESSING APPARATUS

(75) Inventor: Christopher William Wagstaffe, Swadincote (GB)

(73) Assignee: Extec Industries, PLC, Derbyshire (GB)

( * ) Notice: Subject to any disclaimer, the term of this patent is extended or adjusted under 35 U.S.C. 154(b) by 0 days.

(21) Appl. No.: 10/130,471

(22) PCT Filed: Sep. 26, 2001

(86) PCT No.: PCT/GB01/04310

§ 371 (c)(1), (2), (4) Date: May 17, 2002

(87) PCT Pub. No.: WO02/26403

PCT Pub. Date: Apr. 4, 2002

(65) Prior Publication Data

US 2003/0047415 A1 Mar. 13, 2003

(30) Foreign Application Priority Data

Sep. 29, 2000 (GB) ............................................ 0023866

(51) Int. Cl.[7] ................................................ B65G 15/26

(52) U.S. Cl. ....................... 198/313; 209/241; 198/632; 198/538

(58) Field of Search ................................ 209/241, 247, 209/248, 249; 198/313, 314, 632, 311, 538

(56) References Cited

U.S. PATENT DOCUMENTS 4,058,198 A * 11/1977 O'Neill et al. .............. 198/313
4,063,375 A * 12/1977 Satterwhite .................. 37/190
4,591,432 A * 5/1986 Hartl .......................... 209/247
4,879,023 A * 11/1989 Mallaghan .................. 209/241
4,983,280 A * 1/1991 Eriksson ..................... 209/241
5,979,666 A * 11/1999 Douglas ..................... 209/241
6,186,338 B1 * 2/2001 Douglas ..................... 209/421

FOREIGN PATENT DOCUMENTS

| | | |
|---|---|---|
| DE | 4032507 | 8/1991 |
| EP | 301798 | 2/1989 |
| GB | 1553667 | 9/1979 |
| WO | WO 85/03652 | 8/1985 |
| WO | WO 95/12462 | 5/1995 |
| WO | WO 00/43133 | 7/2000 |

* cited by examiner

*Primary Examiner*—Christopher P. Ellis
*Assistant Examiner*—Richard Ridley
(74) *Attorney, Agent, or Firm*—Madson & Metcalf

(57) ABSTRACT

A bulk material processing apparatus having a longitudinally extending main frame and a supply conveyor mounted on, and extending length wise of the main frame to convey a supply of bulk material from a forward lower end of the conveyor to an upper and rearward discharge end. A material processing device is mounted on the main frame and arranged to receive material from the discharge end of the supply conveyor, to process the material, and to discharge processed material. A discharge conveyor is mounted on the main frame below the processing device to receive processed material discharged by the processing device and to discharge the material to a discharge point located rearwardly of the apparatus. The processing device is moveable between a raised operating position and a lowered transport position. Likewise, the discharge conveyor is moveable between a raised operative position and a lowered inoperative position. The discharge conveyor has a first part mounted on the main frame and a second part which is adjustable between an operative position, in which it forms a prolongation of the first part, and a folded transport position in which it extends below the first part.

20 Claims, 6 Drawing Sheets

BULK MATERIAL PROCESSING APPARATUS

This invention relates to a bulk material processing apparatus.

The type of bulk material with which the invention is concerned includes quarry stone, site clearance material, domestic and industrial waste, and the apparatus will therefore be provided with processing equipment appropriate to the material to be handled.

In a quarry environment, it is known to provide screening plants for processing crushed stone material, and in particular to screen the material into one or more screened size ranges e.g. sand, ballast and aggregate, in which case the processing equipment usually comprises a so-called “screen box”. It is usual to provide an input hopper for receiving the bulk material, and a conveyor e.g. an elevator, to transfer the bulk material to the screen box. One or more discharge conveyor is arranged to receive screened material from the screen box and to discharge the screened material e.g. to stockpiles.

Screening plants range in size from massive static installations, down to smaller self-propelled screening plants e.g. for screening material to be used in filling pipeline trenches. Very large static installations are assembled on site e.g. at a quarry, and usually will remain there until the source of raw material is exhausted.

However, there is a substantial demand for screening plants which are readily transportable from one site to another e.g. on a low loader, or by being towed as a trailed vehicle, and therefore it is highly desirable to design such plants in such a way that the operating components can be readily adjusted between an operative (e.g. screening) mode, and a transport mode. Evidently, in the operative or deployed position of the apparatus, it will be (a) greater in height, (b) wider and (c) longer than when in the transport position. It is therefore necessary to design the apparatus, and the assembly of the movable components, in such a way that the moving components can be easily adjusted between deployed and transport positions, and without interfering with each other.

The supply conveyor takes the bulk material from its input (hopper) end, and elevates the material to its upper discharge end, and from which it falls under gravity to the screen box. The screen box separates the bulk material into different size ranges, and the separated material falls onto corresponding discharge conveyors i.e. one for each size range, and which can then discharge the screened material onto separate stockpiles which are formed alongside and/or rearwardly of the apparatus.

Rearward discharge conveyors are usually referred to as “tail conveyors”, whereas one or more further discharge conveyor arranged to discharge the material to a respective side of the apparatus is usually referred to as a “side conveyor”. A side conveyor, when in the deployed position, extends laterally outwardly of the apparatus, and therefore does not take-up much of the space below the screen box. Furthermore, when adjusted to a transport position, a side conveyor is usually located along one side of the apparatus i.e. extending generally parallel to the longitudinal axis of the apparatus, and therefore against does not take-up any appreciable portion of the space available below the screen box.

However, a tail conveyor extends parallel to the longitudinal axis of the apparatus, when in the deployed position, and therefore occupies a large proportion of the space available below the screen box. When the apparatus is adjusted to a transport mode, it is necessary to reduce the overall height of the apparatus (so as to be able to pass with clearance below bridges), and therefore the discharge end of the supply conveyor, and also the screen box, are usually adjusted downwardly together to take-up the transport position. Therefore, the mounting of the tail conveyor in the space below the screen box must be such that (a) the tail conveyor can allow the downward movement of the screen box and (b) the tail conveyor also can be adjusted to take-up its transport position.

In the current state of the art, a tail conveyor usually is in two parts, of which a first part is pivotally mounted on the main frame or chassis of the apparatus, and a second part forms a prolongation of the first part when in the deployed position. However, the second part can be pivoted to an upwardly extending position to provide a transport mode of the tail conveyor. In this position, the overall length of the apparatus is reduced, but evidently the second part of the tail conveyor will be located rearwardly of the rear end of the screen box and the discharge end of the supply conveyor (after downward adjustment of the screen box and the supply conveyor).

Therefore, in the current state of the art, there are serious design constraints in the mounting of the screen box, the supply conveyor and the tail conveyor on the frame of the apparatus, given that all of these components must be provided with freedom of movement between the respective deployed and transport positions and without interfering with each other.

The present invention seeks to provide a bulk material processing plant e.g. a screening plant, and preferably a self-propelled apparatus, in which a different mode of adjustment is provided for the tail conveyor, and, in a first aspect, giving technical advantage of better utilisation of the space available and, in a second aspect, improved access to components above the tail conveyor e.g. a screen box in the case of a screening apparatus.

According to a first aspect of the invention there is provided a bulk material processing apparatus which comprises:

a longitudinally extending main frame;

a supply conveyor mounted on, and extending lengthwise of the main frame, and operative to convey a supply of bulk material from a forward lower end of the conveyor to an upper and rearward discharge end;

a material processing device mounted on the main frame and arranged to receive material from the discharge end of the supply conveyor, to process the material, and to discharge processed material;

a discharge conveyor mounted on the main frame below the processing device so as to be able to receive processed material discharged by the processing device, and to discharge the material to a discharge point located rearwardly of the apparatus;

means mounting the processing device on the main frame for movement between a raised operating position to a lowered transport position; and, means mounting the discharge conveyor on the main frame for movement between a raised operative position and a lowered inoperative position;

in which the discharge conveyor has a first part which is mounted on the main frame, and a second part which is adjustable between an operative position in which it forms a prolongation of the first part, and a folded transport position in which it extends below the first part.

According to a second aspect of the invention there is provided a bulk material processing apparatus which comprises:

a longitudinally extending main frame;

a supply conveyor mounted on, and extending lengthwise of the main frame, and operative to convey a supply of bulk material from a forward lower end of the conveyor to an upper and rearward discharge end;

a material processing device mounted on the main frame and arranged to receive material from the discharge end of the supply conveyor, to process the material, and to discharge processed material;

a discharge conveyor mounted on the main frame below the processing device so as to be able to receive processed material discharged by the processing device, and to discharge the material to a discharge point located rearwardly of the apparatus;

means mounting the processing device on the main frame for movement between a raised operating position to a lowered transport position;

means mounting the discharge conveyor on the main frame for movement between a raised operative position and a lowered inoperative position; and, means connecting the discharge conveyor to the processing device so that they are movable together between the respective operating and transport positions.

in which the discharge conveyor is adjustable to a lowered inoperative position in which space is defined between the discharge conveyor and the processing device, when the latter is adjusted to its transport position, to allow access to the operating components of the processing device.

In a preferred application of the invention, the first and second aspects are combined.

Preferred features of the invention comprise:

(a) extendable link pivotally to adjust the sub-frame of the processing device on the main frame;

(b) independently operated extendable link between sub-frame and discharge conveyor frame to allow discharge conveyor to take-up the lowered inoperative position;

(c) the processing device is a screen box;

(d) the screen box has two parts, one adjustable in screening angle relative to the other;

(e) the second part of the discharge conveyor has a toggle joint connection to the first part;

(f) the first part is pivotally mounted on the main frame;

(g) the apparatus has a wheel-set to render the apparatus towable;

(h) a hopper is provided at the input end of the supply conveyor;

(i) the supply conveyor is a two-part elevator, of which the first part is pivotally adjustable on the main frame, and the second part is adjustable between an operative position forming a prolongation of the first part, and a lower position in which the discharge end of the elevator is lowered;

(j) combined downward movement of the elevator and the screen box;

(k) the processing device is a crusher or shredder unit, or a screen box.

A preferred embodiment of bulk material processing apparatus according to the invention will now be described in detail by way of example only, with reference to the accompanying drawings, in which:

FIG. 1 is a side view of a rear end of a mobile screening plant, having a tandem screen box, an elevator for conveying a supply of bulk material to the screen box assembly, and a rear or “tail” discharge conveyor arranged below the tandem screen box for discharging screened material to a stockpile located rearwardly of the apparatus, and in which the operating components of the apparatus are shown in deployed or operative positions;

Figure 4:
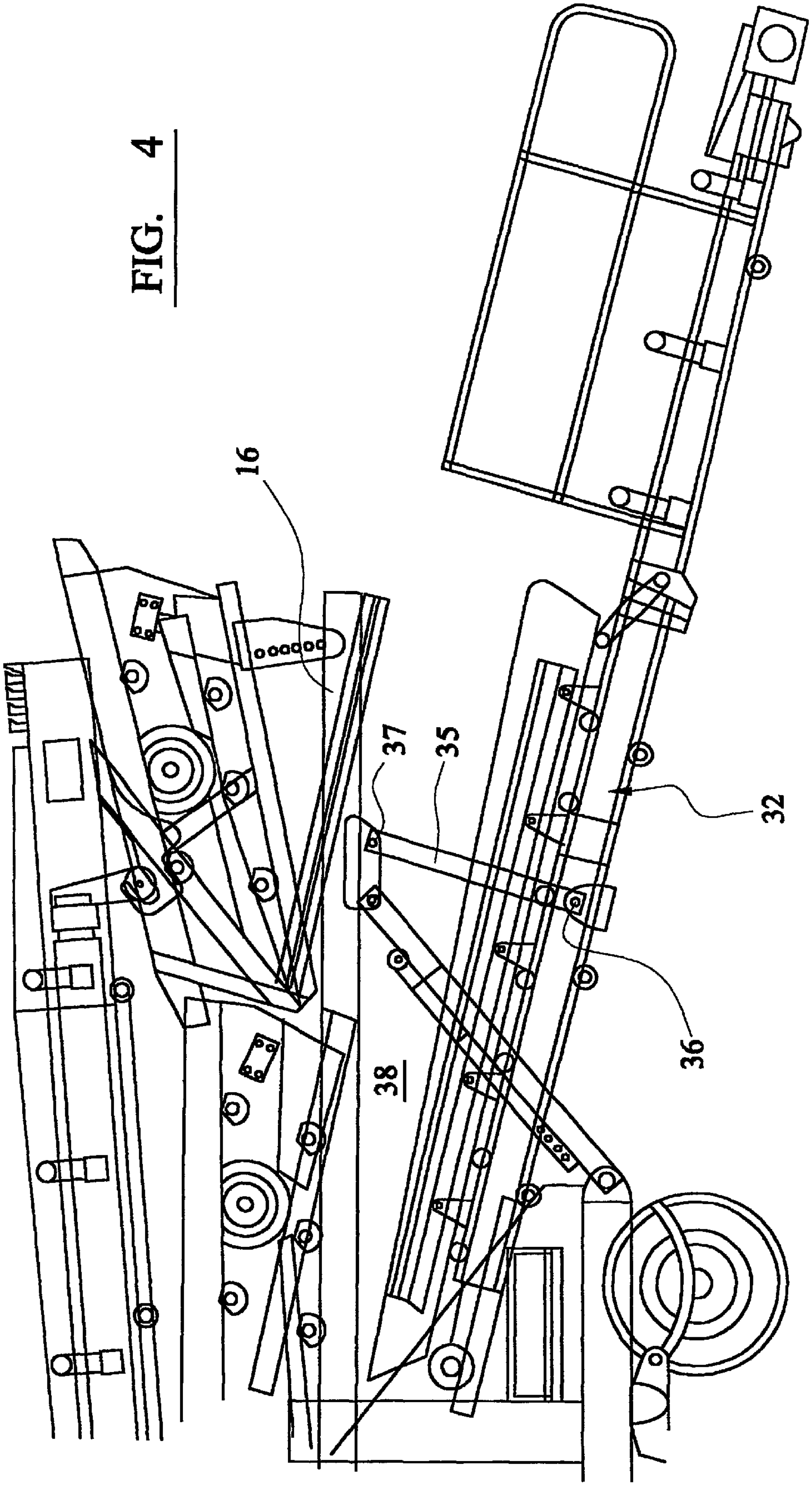
Figure 5:
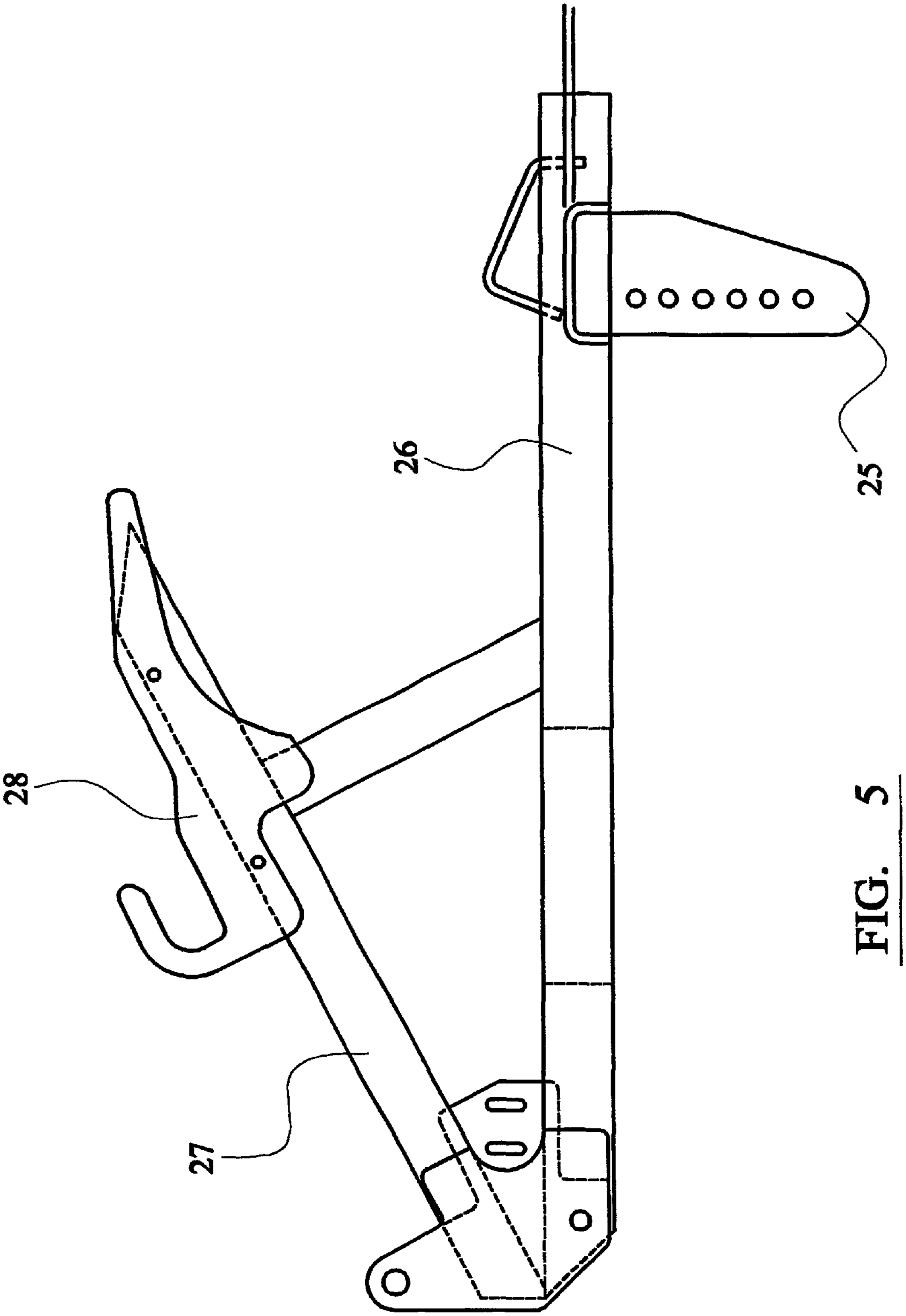
Figure 6:
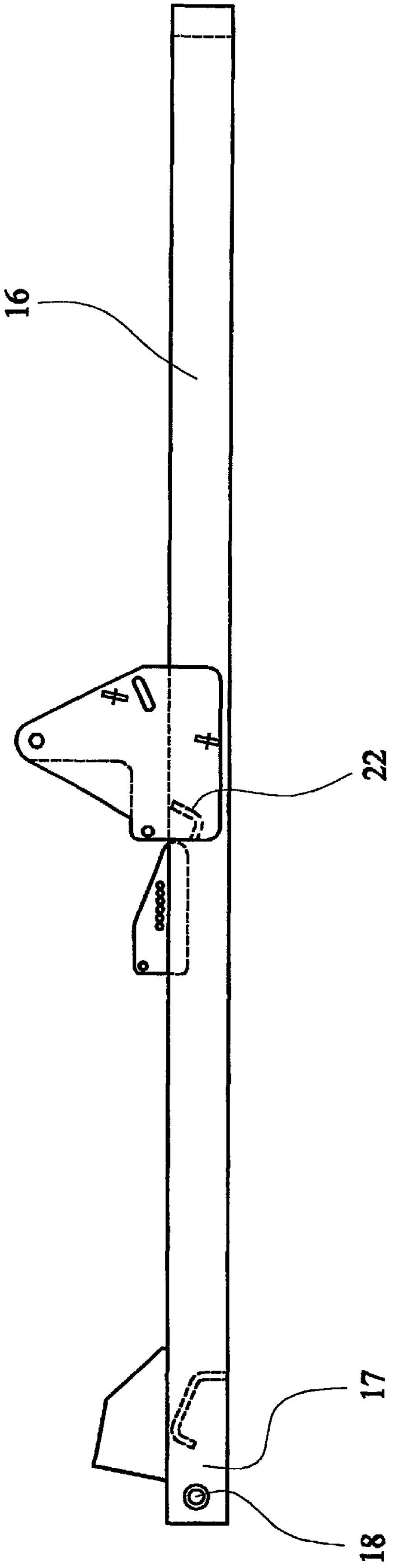

FIG. 4 is a side view showing the elevator and the tandem screen box assembly lowered to a transport position, but in which the tail conveyor is adjusted to a lowered position relative to the sub-frame carrying the tandem screen box assembly, so as to create space between the tail conveyor and the underside of the tandem screen box assembly, to allow access to the screen box assembly for maintenance purposes;

FIG. 5 is a detail view of a sub-frame assembly for a primary screen of the tandem screen box assembly, and which forms part of an adjustable support connection for the upper discharge end of the elevator; and, FIG. 6 is a side view of a main sub-frame assembly for supporting primary and secondary screens of the tandem screen box assembly, and also forming mounting connections for (a) a telescopically adjustable support arrangement mounting the main sub-frame on the chassis of the apparatus and (b) a lengthwise adjustable support extending between a sub-frame of the tail conveyor and the main sub-frame of the tandem screen box.

Figure 1:
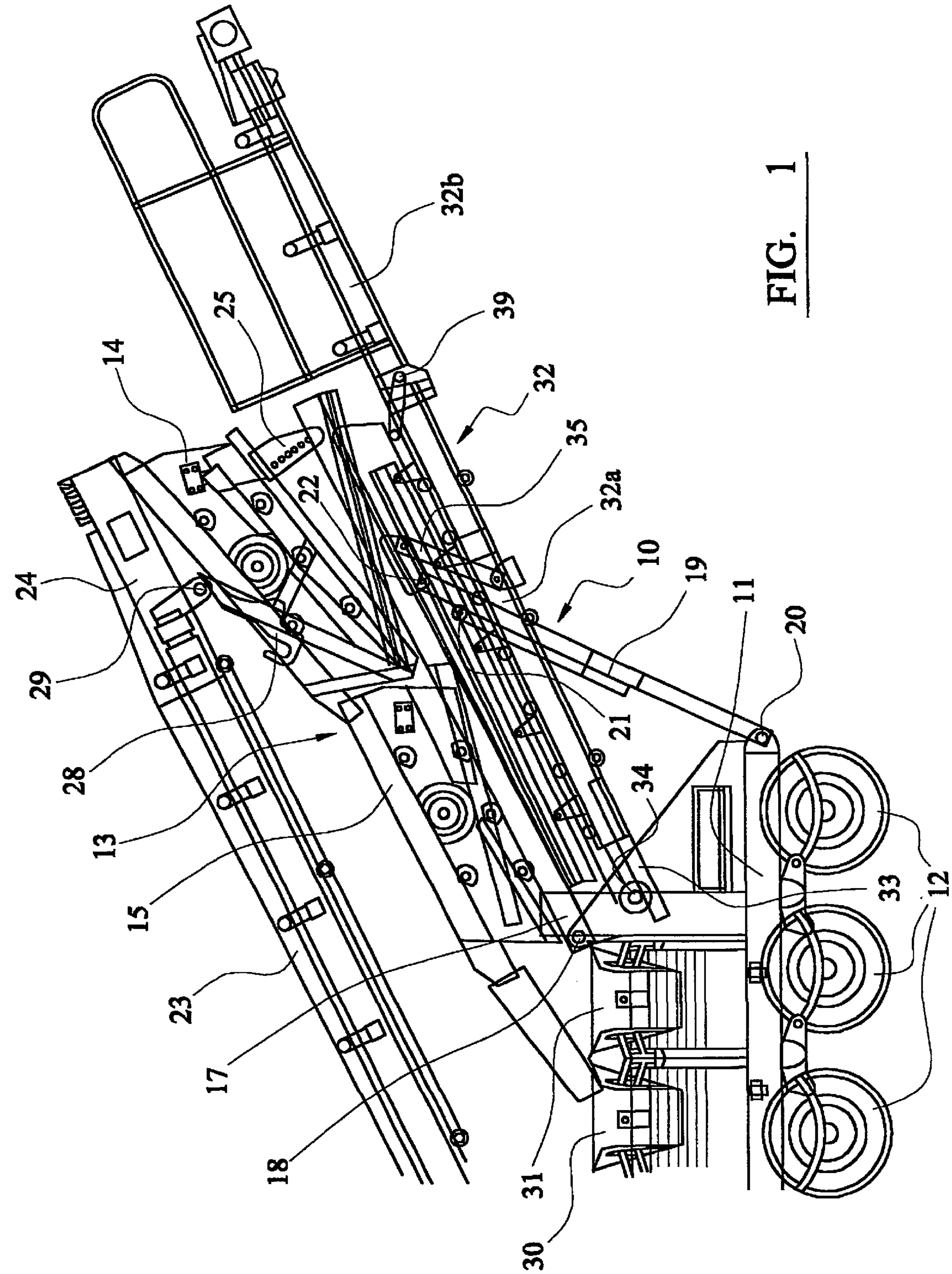
Figure 2:
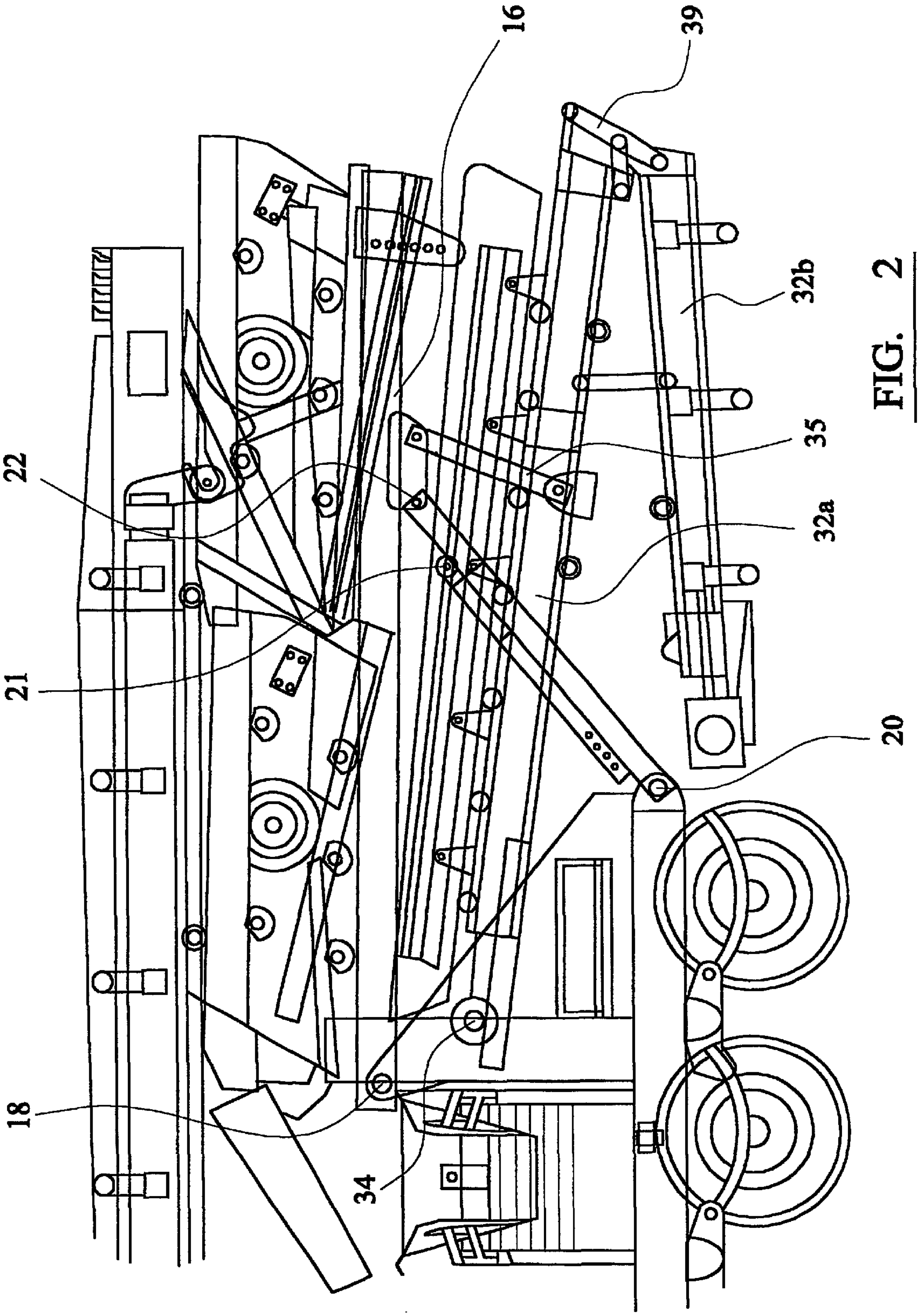
FIG. 2 is a view, similar to FIG. 1, but showing the operating components after adjustment to a transport position, in which the tail conveyor has first and second parts folded one below the other.
Figure 3:
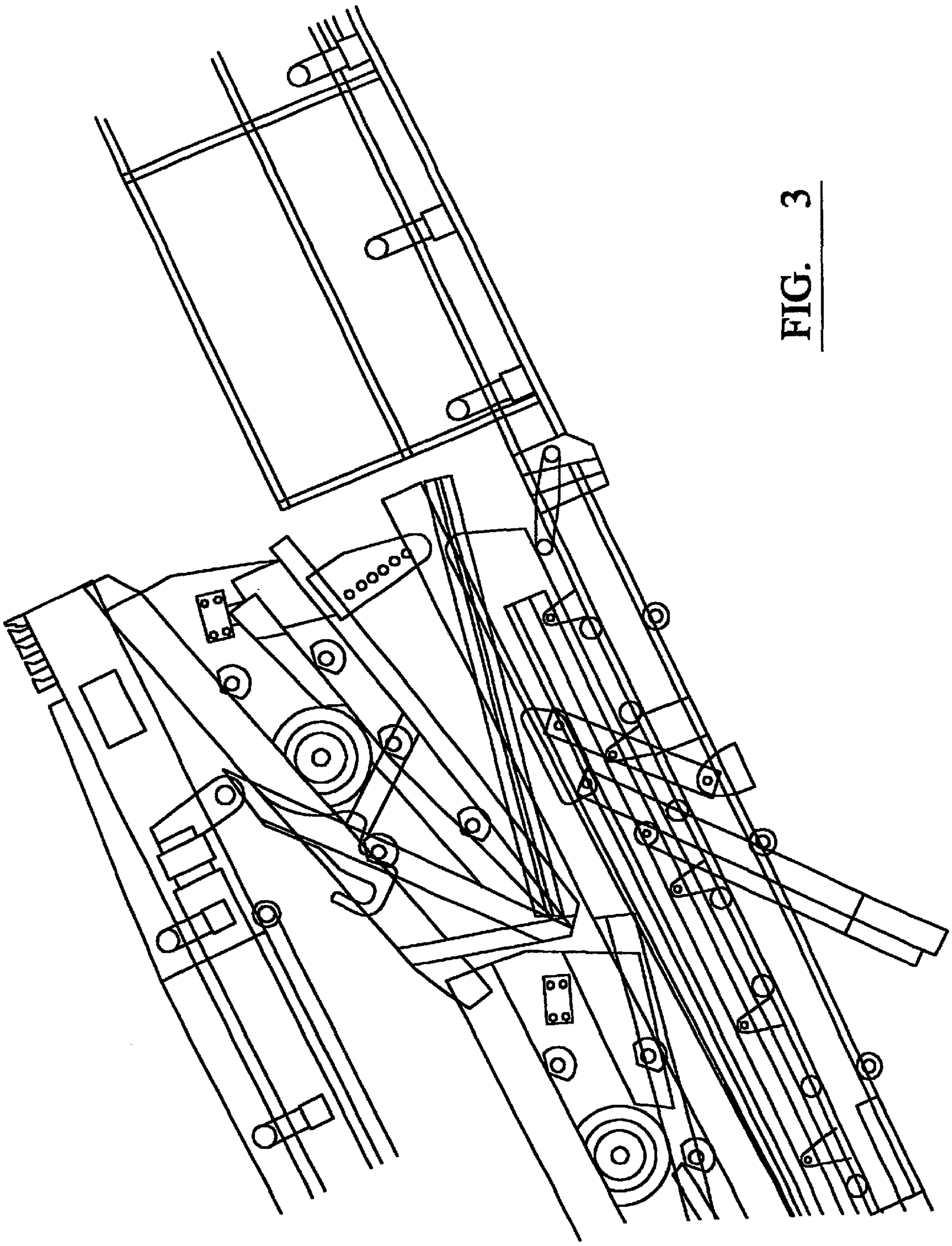
FIG. 3 is a detail view, to an enlarged scale, showing the assembly of the elevator, tandem screen box assembly and tail conveyor when in their deployed position.

Referring now to the drawings, there is shown an embodiment of bulk material processing plant according to the invention, which in the illustrated example comprises a mobile screening plant, designated generally by reference 10, and having a main frame or chassis 11 supported by one or more wheel-set 12. FIGS. 1, 2 and 3 show the rear end of the apparatus only, but the forward end may have an input hopper at a forward lower end of a supply conveyor, and such forward end may be supported above the ground by support legs, if required. The forward end may also be supported by a set of crawler tracks, or may have a fifth wheel coupling to allow the entire apparatus to be towed behind a transport vehicle.

The screening plant 10 has a tandem screen box assembly 13, comprising primary screen box 14 and secondary screen box 15. The assembly 13 is mounted on the main frame 11 via a main sub-frame assembly 16 (see FIG. 6) of which one end 17 is mounted on the main frame 11 via a horizontal pivot 18. The sub-frame assembly 16 can be adjusted upwardly and downwardly about the horizontal pivot 18, in order to adjust the assembly 13 between a raised operative or deployed position, as shown in FIG. 1 and FIG. 3, and a lowered transport position as shown in FIG. 2. In order to lower and raise the sub-frame assembly 16, a telescopically adjustable support link 19 is provided, which extends between a lower mounting point 20 on the chassis 11 and the upper connections 21, 22 with the sub-frame 16.

A supply conveyor or elevator 23 can deliver a supply of bulk material to be processed to the screen box assembly 13, such material falling under gravity from the upper discharge end 24 of the elevator 23 and onto an upper deck of the primary screen box 14. The angle of inclination of the sub-frame 16 to the horizontal can be adjusted by operation of the telescopic link 19, and this sets an overall screening angle for the screen box assembly 13. However, primary screen 14 can, in addition, be adjusted to a different screening angle relative to the general screening angle of the screen box, by upward or downward adjustment pivotably by means of an adjustable link 25.

The upper discharge end 24 of the elevator 23 rests on the upper end of the primary screen box 14, as shown in FIG. 1, and therefore the elevator 23 can move upwardly and downwardly with upward and downward movement of the sub-frame 16. Therefore, the elevator and the tandem screen box assembly 13 can move jointly between the operative position shown in FIG. 1, and a lowered transport position shown in FIG. 2. However, there is an additional slidable connection between the sub-frame of the primary screen box 14 and the elevator frame, whereby the elevator 23 can be locked in the transport position after the elevator and the screen box assembly 13 have been lowered to the transport position. The sub-frame of the primary screen box is shown in FIG. 5, and is designated by reference 26. Sub-frame 26 comprises an A-frame structure, and on an upper limb 27 there is provided a catcher device 28 which is movable into slidable engagement with a horizontal guide roller 29 on the underside of the discharge end 24 of the elevator 23, and which are shown in FIG. 2 fully interengaged, in order to lock the elevator in the lowered transport position.

The primary and secondary screen boxes 14 and 15 are able to carry out primary and secondary screening of the bulk material, and different size ranges which are screened are discharged to side discharge conveyors 30 and 31 in known manner.

A rear discharge or tail conveyor 32 is pivotally mounted at an inboard end 33 on the main frame 11 of the apparatus, and is capable of moving upwardly and downwardly about a horizontal pivot 34. Also, means (35) is provided which connects the discharge conveyor 32 to the screen boxes 14, 15 (processing device) so that they are movable together between the operating and transport positions. Thus, the frame of the conveyor 32 is raised and lowered between the operative position of FIG. 1 and FIG. 3, and the lowered transport position of FIG. 2, by means of a tensile link 35 which extends between a lower end 36 connected to a carrying frame of the conveyor 32, and an upper end 37 connected to the sub-frame assembly 16 of the tandem screen box assembly 13. Tensile link 35 is normally of fixed length, when it is desired that the conveyor 32 moves upwardly and downwardly together with the upward and downward movement of screen box assembly 13 and elevator 23. However, if it is desired to create a space between the underside of the tandem screen box assembly 13 and the elevator 32, whereby access can be had to the screen boxes for maintenance purposes e.g. to change a screen box mesh, the telescopic link 19 is retracted to the position shown in FIG. 4, but in addition tensile link 35 is adjusted to increase its length, whereby tail conveyor 32 takes up the downwardly inclined position shown in FIG. 4. Clearly, access space 38 is defined between the sub-frame 16 (when in its transport position) and the discharge conveyor 32 in the adjusted position shown in FIG. 4. Therefore, the position and angle of the link 35 allows the distance between the supporting sub-frame 16 and the conveyor 32 to be varied, depending upon the angle of elevation.

Referring now to FIG. 2 in particular, this shows a folded transport position of the rear discharge conveyor or tail conveyor 32, from which it can be seen that conveyor 32 comprises a first part 32*a* pivotally mounted at its inboard end on pivot 34, and a second part 32*b* which takes-up a folded transport position in which it extends below the first part 32*a*. A toggle mechanism 39 interconnects the conveyor parts 32*a* and 32*b*, and is mechanically driven e.g. by a piston/cylinder arrangement, in order to adjust second part 32*b* from its operative position as shown in FIG. 1 (in which it forms an upward and rearward prolongation of the first part 32*a*), and its folded transport position shown in FIG. 2.

The illustrated embodiment of the invention comprises a mobile screening plant. However, it should be understood that the invention may be applied to other types of bulk material processing apparatus, including crushing plant, shredding plant etc, and in which case the "material processing device" will be appropriate to the processing operation required, and therefore screen box assembly 13 is merely one example of the bulk material processing device which may be utilised in the invention.

What is claimed is:

1. A bulk material processing apparatus which comprises:

a longitudinally extending main frame;

a supply conveyor mounted on, and extending lengthwise of the main frame, and operative to convey a supply of bulk material from a forward lower end of the conveyor to an upper and rearward discharge end;

a material processing device mounted on the main frame and arranged to receive material from the discharge end of the supply conveyor, to process the material, and to discharge processed material;

a discharge conveyor having a single endless conveyor belt and mounted on the main frame below the processing device so as to be able to receive processed material discharged by the processing device, and to discharge the material to a discharge point located rearwardly of the apparatus;

a first connection mounting the processing device on the main frame for movement between a raised operating position to a lowered transport position; and, a second connection mounting the discharge conveyor on the main frame for movement between a raised operative position and a lowered inoperative position;

in which the discharge conveyor has a first part which is mounted on the main frame, and a second part which is adjustable between an operative position in which it forms a prolongation of the first part, and a folded transport position in which it extends below the first part.

2. A bulk material processing apparatus which comprises:

a longitudinally extending main frame;

a supply conveyor mounted on, and extending lengthwise of the main frame, and operative to convey a supply of bulk material from a forward lower end of the conveyor to an upper and rearward discharge end;

a material processing device mounted on the main frame and arranged to receive material from the discharge end of the supply conveyor, to process the material, and to discharge processed material;

a discharge conveyor having a single endless conveyor belt and mounted on the main frame below the processing device so as to be able to receive processed material discharged by the processing device, and to discharge the material to a discharge point located rearwardly of the apparatus, wherein the discharge conveyor has a first part which is mounted on the main frame, and a second part which is adjustable between an operative position in which it forms a prolongation of the first part, and a folded transport position in which it extends below the first part;

a first connection mounting the processing device on the main frame for movement between a raised operating position a lowered transport position;

a second connection mounting the discharge conveyor on the main frame for movement between a raised operative position and lowered inoperative position;

a third connection means connecting the discharge conveyor to the processing device so that they are moveable together between the respective operating and transport positions;

in which the discharge conveyor is adjustable to a lowered inoperative position in which space is defined between the discharge conveyor and the processing device, when the latter is adjusted to its transport position, to allow access to the operating components of the processing device.

3. A bulk material processing apparatus according to claim 1, in which the discharge conveyor is also adjustable to a lowered inoperative position in which space is defined between the discharge conveyor and the processing device when the latter is adjusted to its transport position, to allow access to the operating components of the processing device.

4. A bulk material processing apparatus according to claim 1, including a sub-frame for the processing device, and an extendable link mounting the sub-frame on the main frame, and adjustable to move the frame between a transport position, and a raised operative position.

5. A bulk material processing apparatus according to claim 4, in which the processing device is a screen box, and in which upward adjustment of the sub-frame sets an overall screening angle for the screen box assembly.

6. A bulk material processing apparatus according to claim 5, in which the screen box assembly comprises a primary screen box and a secondary screen box, and in which the primary screen box is adjustable in screening angle relative to the screening angle set for the secondary screen box by the adjustment of the sub-frame.

7. A bulk material processing apparatus according to claim 1, in which the discharge conveyor has a first part pivotally mounted on the main frame via pivot and a second part connected to the first part via a toggle joint connection.

8. A bulk material processing apparatus according to claim 1, including one or more wheel-set supporting the chassis, to render the apparatus mobile.

9. A bulk material processing apparatus according to claim 1, including a hopper provided at the lower input end of the supply conveyor.

10. A bulk material processing apparatus according to claim 1, in which the supply conveyor is a two part elevator, of which the first part is pivotally adjustable on the main frame, and the second part is adjustable between an operative position forming a prolongation of the first part, and a lower position in which the discharge end of the elevator is lowered.

11. A bulk material processing apparatus to claim 10, in which the elevator and the processing device are configured to move upwardly and downwardly together.

12. A bulk material processing apparatus according to claim 11, including a slidable interconnection between the discharge end of the elevator and a sub-frame of the primary screen box, and which are interengageable in order to lock the elevator to the primary screen box in the transport position.

13. A bulk material processing apparatus according to claim 1, in which the bulk material processing device is a crusher or shredder unit, and/or a screen box.

14. A bulk material processing apparatus according to claim 2, including a sub-frame for the processing device, in which said third connection comprises a tensile link extending between the sub-frame of the processing device and the frame of the discharge conveyor.

15. A bulk material processing apparatus according to claim 14, in which the tensile link is adjustable in order to vary the spacing between the sub-frame and the frame of the discharge conveyor.

16. A bulk material processing apparatus according to claim 1, including one or more wheel-set supporting the chassis, to render the apparatus towable.

17. A bulk material processing apparatus according to claim 2, in which the discharge conveyor has a first part pivotally mounted on the main frame via pivot and a second part connected to the first part via a toggle joint connection.

18. A bulk material processing apparatus according to claim 2, in which the supply conveyor is a two part elevator, of which the first part is pivotally adjustable on the main frame, and the second part is adjustable between an operative position forming a prolongation of the first part, and a lower position in which the discharge end of the elevator is lowered.

19. A bulk material processing apparatus according to claim 18, including a slidable interconnection between the discharge end of the elevator and a sub-frame of the primary screen box, and which are interengageable in order to lock the elevator to the primary screen box in the transport position.

20. A bulk material processing apparatus according to claim 1, wherein the second part of the discharge conveyor in the folded transport position is pivoted through approximately 180 degrees such that extends below the first part.

* * * * *

UNITED STATES PATENT AND TRADEMARK OFFICE

CERTIFICATE OF CORRECTION

PATENT NO. : 6,705,449 B2 
DATED : March 16, 2004
INVENTOR(S) : Christopher William Wagstaffe It is certified that error appears in the above-identified patent and that said Letters Patent is hereby corrected as shown below:

Column 6,
Line 66, please delete "means".

Signed and Sealed this

Tenth Day of August, 2004

JON W. DUDAS
*Acting Director of the United States Patent and Trademark Office*